Aug. 15, 1961     J. VIAL     2,996,154

MEANS FOR BLOCKING A ROTATABLE SHAFT

Filed Feb. 11, 1958

United States Patent Office 2,996,154
Patented Aug. 15, 1961

2,996,154
MEANS FOR BLOCKING A ROTATABLE SHAFT
Joseph Vial, 38 Ave. Hoche, Paris, France
Filed Feb. 11, 1958, Ser. No. 714,603
Claims priority, application France May 21, 1957
6 Claims. (Cl. 188—69)

This invention relates to mechanism for blocking a rotatable element or shaft. While a variety of systems have been proposed for blocking a rotatable element, such systems have usually involved frictional engagement so that the resulting blocking effect is non positive. Where on the other hand it is desired to achieve a positive blocking action as through the cooperation of dog teeth, clutch claws or similar interlocking members respectively provided on the rotatable element and upon a blocking member movable radially towards and away from the element, the rotatable element cannot be blocked indiscriminately in any angular position, since it is first necessary to bring the rotatable element and blocking member to such a relative angular position that the cooperating teeth or other interlocking parts thereof are able to interlock without mutual interference. This necessity has been a source of complications in the past.

It is therefore an object of this invention to provide improved mechanism for blocking a rotatable element, which will be operative regardless of the particular angular position of the element at the time of operation of the mechanism, and which at the same time will be positive in action. Another object is to provide positive blocking mechanism of this kind including improved provision for self-alignment between the interlocking portions, e.g. dog teeth, provided on the element and on a blocking member therefor. A further object is to provide such mechanism which will be simple and economical to construct, and rugged and reliable in operation.

In accordance with an important aspect of the invention, there is provided a system for blocking a rotatable element, comprising a peripheral set of first dog teeth on the element, a block member having a concave arcuate segmental set of second dog teeth complementary to and engageable with said first teeth, means mounting the block member for movement in a plane normal to the rotational axis of the element to permit radial displacement of the member towards and away from the element for engagement and disengagement of said second teeth with and from said first teeth while also permitting limited lateral shifting of the block member for relative alignment between said first and second teeth, a cam member mounted for axial movement parallel to said axis and for limited angular movement about another axis parallel to said first axis, and cooperating cam surfaces on said block and cam members sloping at an angle to said axis, whereby axial movement of the cam member will impart radial movement to the block member towards and away from the element to engage and disengage said second teeth with and from said first teeth, while angular movement of the cam member will simultaneously provide for lateral shifting of the block member for self-alignment of said second teeth relative to said first teeth.

The above and further objects, aspects and features of the invention will appear as the disclosure proceeds, with reference to the accompanying drawings serving to illustrate one form of embodiment of the invention for purposes of explanation but not of limitation. In the drawings.

Figure 1:
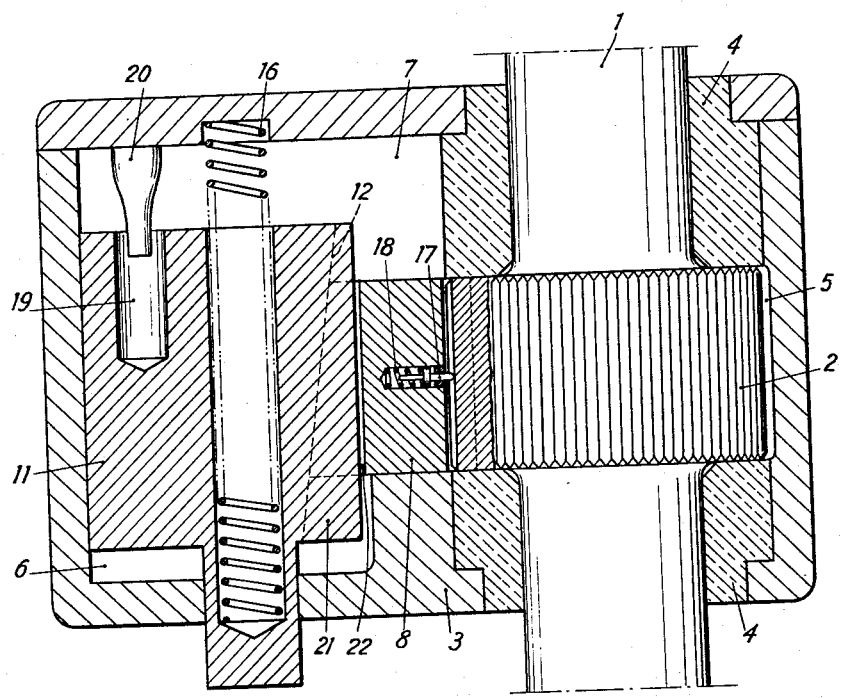
FIG. 1 is a simplified axial cross sectional view of the mechanism.

As shown, a casing 3 has a pair of bearings 4 received in opposite flat walls near one end of the casing, which bearings serve to journal a rotatable shaft 1. An enlarged portion of the shaft in the space 5 defined between the bearings 4 has a peripheral set of dog teeth 2 formed around it.

Figure 2:
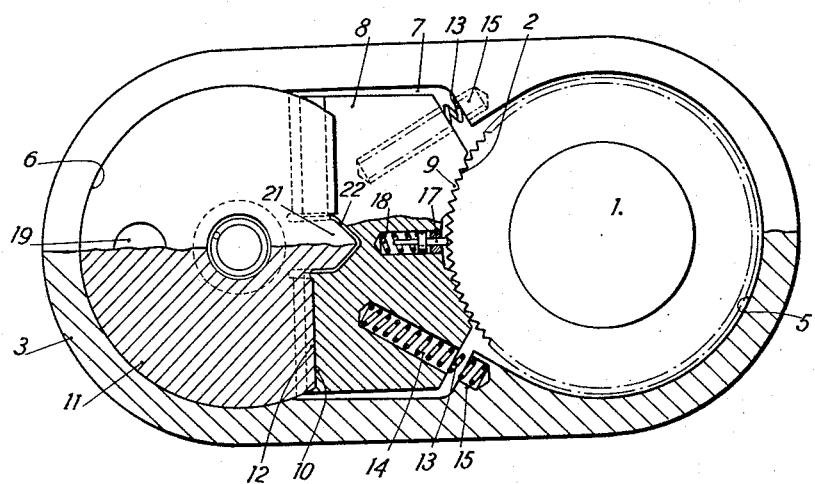
FIG. 2 is a corresponding view in plan, partly in section.

A blocking member 8 has a concave arcuate segmental set of dog teeth 9 formed on one side of it as clearly shown in FIG. 2, the dog teeth 9 being adapted to engage with the dog teeth 2 of the shaft when the blocking member 8 is in advanced position as illustrated in the drawing. The blocking member 8 is so received within a recess generally designated 7 defined between surfaces of the casing 3 and the bearings 4 as to be constrained for movement in a plane normal to the axis of shaft 1. However, member 8 is not so limited in its movements that it can only move radially towards and away from the shaft, but said member is mounted with a substantial degree of lateral clearance, as will be apparent from FIG. 2, so that in addition to its radial displacements it can further assume some lateral shifting displacements relative to the shaft. This provision will serve to permit of a self-aligning shifting action of blocking member 8 whereby its dog teeth 9 will be adapted at all times to interlock properly with the dog teeth 2 of the shaft as will more fully appear hereinafter.

Defined in the casing 3 towards the end thereof opposite from the end receiving the shaft 1 is a part-cylindrical bore 6 having an axis parallel to that of the shaft, and within this bore a part cylindrical cam member 11 is received so as to be both axially and angularly displaceable therein. The cam member 11 has its side directed towards blocking member 8 cut away angularly to form a flat oblique cam surface 12 sloping at a relatively small angle to the axis of the cam member.

The adjacent side of blocking member 8 is cut obliquely to define a mating surface 10 complementary to the oblique surface 12 of the member 11. Both mating surfaces 10 and 12 are preferably highly polished and the common angle formed by them with respect to the axial direction is selected so as to be somewhat smaller than the friction angle existing between the materials from which said surfaces are formed. An angle of about eight degrees has been satisfactorily used.

The blocking member 8 is urged away from the shaft 1 (leftward as shown) towards a retracted position in which its flat oblique surface 10 engages with mating cam surface 12 and in which its dog teeth formed in the arcuate depression 9 are out of engagement with the shaft dog teeth 2, by a pair of coil springs 13 contained partly in recesses 14 formed in member 8 and partly in aligned recesses 15 formed in bosses of the casing 3.

Furthermore, the cam member 11 is axially urged (downward as shown in FIG. 1) towards a position in which its camming surface 12 tends to force the block member 8 into engagement with the shaft 1, by a strong coil spring 16 received in a recess of the cam member 11 and acting against the top wall of the casing 3.

It will therefore be seen that with the arrangement so far described, the powerful spring 16 urges the cam member 11 downwards so that the member 11 in turn urges block member 8 rightwards into engagement with the dog teeth 2 of shaft 1, whereby the shaft is positively blocked against rotation. To release the shaft, pressure is exerted on cam member 11 upwardly to a degree sufficient to overcome the axial downward pressure of spring 16. E.g. by action of a fluid pressure activator (or the like), not shown, upon the lower projecting extremity of a shank depending from the lower face of cam member 11, which shank projects as shown through the bottom wall of casing 3 and simultaneously serves as a means for guiding the cam member 11 in its angular and axial displacements in the casing. On application of such upward pressure to overcome the force of spring 16, cam member 11 is lifted, allowing the block member, 8 to be pushed leftward by springs 13 to disengage its dog teeth from the dog teeth 2 of the shaft, whereupon the shaft is released for free rotation. It will again be noted that concurrently with its radial displacements towards and away from the shaft the latch member 8 is allowed considerable clearance for lateral shifting displacements with respect to the shaft.

Means will now be described whereby the mating dog teeth on the blocking member and the shaft will be made to engage precisely with one another at every engaging operation, avoiding a condition in which the ridges of the two sets of teeth might encounter one another end-on with consequent unreliable clutch operation and damage to the parts. As shown, such means may comprise a feeler plunger 17 slidable in a cylindrical recess formed in the block member, 8 and having a blunt outer end projecting preferably at a point positioned centrally of the arcuate toothed cutout 9, towards the teeth 2 of the shaft, a spring 18 being provided for urging the feeler 17 into its projecting position. The feeler assembly is so positioned that when it is egaged within a valley between two adjacent ones of the dog teeth 2 on the shaft, the entire set of teeth of the block member 8 are properly positioned for engagement with the valleys between the shaft dog teeth 2, and vice versa, i.e. the two mating sets of dog teeth are then in accurate interfitting relationship. Hence, it will be understood that during a blocking operation as the cam member, 11 is pushed axially downwards by spring 16 and its camming face 12 cams the mating face 10 of the member 8 rightwards, the feeler 17 engages a valley between adjacent teeth 2 and constrains the block 8 to assume a lateral position in which its teeth 9 may freely interlock with the teeth 2 on the shaft.

This is made possible both as a result of the lateral clearance with which member 8 is provided, and as a result of the freedom of angular movement of which cam member 11 is capable, since the small lateral shifting movements of member 8 as it seeks its correct, interlocking position under the action of feeler 17, is transmitted by way of the mating camming surfaces 10 and 12 to the member 11 and produce corresponding small angular shifting movements of the said member. In this way, the self-aligning action of the block member, 8 relatively to the dog teeth 2 in order to produce accurate engagement between the teeth, can be obtained without interfering with the equally essential accuracy of the camming engagement between the cam faces 10—12 of the block and the cam.

Means are further provided for restoring the parts to a centered position at the end of a releasing or disengaging action. For this purpose a cylindrical recess 19 is formed in the top of cam member 11, and cooperates with a finger 20 projecting into it from the top of the casing. The shape of finger 20 in axial contour is tapered or bottle-shaped as show, so as not to prevent the small angular shifting movements of the cam member 11 in accordance with the self-aligning action described above during a blocking operation, while constraining the cam member to assume an accurately predetermined fixed angular position relative to the casing when in the uppermost position corresponding to the disengaged condition of the system.

Similarly, the recentering of the block member 8 relatively to the cam member, 11 during a releasing operation, is taken care of by means comprising an angular projection 21 of the cam member 11 cooperating with a complementary depression 22 in the block member 8, said cooperating means being provided in a central position on the mating surfaces 10 and 12 adjacent the respective lower extremities of said surfaces. Thus, during an engaging movement, ridge 21 disengages the depression 22 so that it does not interfere with lateral shifting movements blocking member 8 involved in the self-aligning operation described. However, towards the end of a disengaging movement, the ridge or nose 21 penetrates into depression 22 and thereby recenters the blocking member 8 relatively to cam member, 11, just as the cam member itself is being recentered relatively to the casing by the action of parts 19 and 20 described above.

It will be understood that various modifications may be made in the structural details illustrated and described without exceeding the scope of the invention as defined in the claims.

Thus, the rotatable element 1 rather than being formed as a shaft may be in the form of a sleeve rotatable about a pivot and having the teeth 2 formed around its periphery. The interlocking elements shown herein (and described for the sake of brevity in the claims) as dog teeth may assume various other forms. The feeler assembly 17—18 while present in a preferred form of embodiment of the invention, may be omitted and the alignment-sensing or feeling function herein performed by it, may instead be performed by the dog teeth or interlocking elements themselves.

The spring 16 serving to urge the camming member in one axial direction may be replaced with some other force means, such as a fluid pressure actuator. Yet other, changes may be conceived within the scope of the ensuing claims by those familiar with the art.

What I claim is:

1. The combination of a rotatable shaft provided with a set of peripheral teeth parallel to the axis of said shaft, a casing enclosing at least the portion of said shaft provided with said teeth, and a system for blocking said rotatable shaft with respect to said casing, said system comprising a unitary block member having a set of teeth complementary to and engageable with the teeth of said shaft, said block member being disposed in said casing and being movable radially with respect to the shaft axis and being shiftable laterally in a plane perpendicular to said axis, a unitary cam member mounted in the casing for axial displacement parallel to said axis and for limited angular oscillating movement about an axis parallel to said shaft axis, said block member and said cam member having cooperating cam faces sloping at an angle to said shaft axis, whereby axial movement of the cam member in a first direction will move said block member radially to interengage both sets of teeth while angular movement of the cam member will take up any lateral shifting of the block member for self alignment of both sets of teeth until the two members fill the radial space between the shaft and the casing by reason of the wedging action of the two cam faces, thus blocking the shaft in relation to said casing, and said cam member being movable in a second axial direction opposite to said first direction to release said wedging action, feeler means projecting from one set of teeth and engageable with the other set for causing a relative lateral shifting between said sets of teeth to align the ridges of one set with the valleys of the other set.

2. The combination of a rotatable shaft provided with a set of peripheral teeth parallel to the axis of said shaft, a casing enclosing at least the portion of said shaft provided with said teeth, and a system for blocking said rotatable shaft with respect to said casing, said system comprising a unitary block member having a set of teeth complementary to and engageable with the teeth of said shaft, said block member being disposed in said casing and being movable radially with respect to the shaft axis and being shiftable laterally in a plane perpendicular to said axis, a unitary cam member mounted in the casing for axial displacement parallel to said axis and for limited angular oscillating movement about an axis parallel to said shaft axis, said block member and said cam member having cooperating cam faces sloping at an angle to said shaft axis, whereby axial movement of the cam member in a first direction will move said block member radially to interengage both sets of teeth while angular movement of the cam member will take up any lateral shifting of the block member for self alignment of both sets of teeth until the two members fill the radial space between the shaft and the casing by reason of the wedging action of the two cam faces, thus blocking the shaft in relation to said casing, and said cam member being movable in a second axial direction opposite to said first direction to release said wedging action, first centering means on said casing and said cam member engageable during axial movement of the cam member in said second axial direction for angularly centering the cam member relative to the casing, and second centering means on said cam member and said block member engageable during radial movement of the block member away from the shaft for laterally centering the block member relative to the cam member.

3. The combination of a rotatable shaft provided with a set of peripheral teeth parallel to the axis of said shaft, a casing enclosing at least the portion of said shaft provided with said teeth, and a system for blocking said rotatable shaft with respect to said casing, said system comprising a unitary block member having a set of teeth complementary to and engageable with the teeth of said shaft, said block member being disposed in said casing and being movable radially with respect to the shaft axis and being shiftable laterally in a plane perpendicular to said axis, a unitary cam member mounted in the casing for axial displacement parallel to said axis and for limited angular oscillating movement about an axis parallel to said shaft axis, said block member and said cam member having cooperating cam faces sloping at an angle to said shaft axis, whereby axial movement of the cam member in a first direction will move said block member radially to interengage both sets of teeth while angular movement of the cam member will take up any lateral shifting of the block member for self alignment of both sets of teeth until the two members fill the radial space between the shaft and the casing by reason of the wedging action of the two cam faces, thus blocking the shaft in relation to said casing, and said cam member being movable in a second axial direction opposite to said first direction to release said wedging action, and first spring means for automatically axially displacing said cam member in said first direction upon release of pressure moving said cam member in said second direction, second spring means urging the block member away from the shaft to apply said camming surfaces into engagement, said second spring means being less powerful than said first spring means urging said cam member in said first axial direction to move the block member radially towards the shaft, first centering means on the casing and on said cam member engageable during axial movement of the cam member in said second axial direction for angularly centering the cam member relative to the casing, and second centering means on said cam member and said block member engageable during radial movement of the block member away from the shaft for laterally centering the block member relative to the cam member.

4. A system as defined in claim 3, wherein said second centering means comprises a tapered projection and a complementary recess respectively formed on said members and adapted for mutual centering engagement when said cam member attains a predetermined axial position relative to the block member during movement of said cam member in said second axial direction.

5. A system as defined in claim 3, wherein said first centering means comprises a tapered projecting element and a recessed element, one of said elements formed on the cam member and the other on the casing and adapted for mutual engagement for angularly centering the cam member relative to the casing when said cam member attains a predetermined axial position relative to the casing during movement of the cam member in said second axial direction.

6. A system as defined in claim 3, wherein said first centering means comprises a tapered projecting element and a recessed element, one of said elements formed on the cam member and the other on the casing and adapted for mutual engagement for angularly centering the cam member relative to the casing when said cam member attains a predetermined axial position relative to the casing during movement of the cam member in said second axial direction, feeler means projecting from one set of teeth and engageable with the other set for causing a relative lateral shifting between said set of teeth to align the ridges of one set with the valleys of the other set.

References Cited in the file of this patent

UNITED STATES PATENTS

| | | |
|---|---|---|
| 737,996 | Bullard | Sept. 1, 1903 |
| 2,373,027 | Hinnekens | Apr. 3, 1945 |
| 2,559,128 | McFarland | July 3, 1951 |
| 2,631,466 | Deveson | Mar. 17, 1953 |
| 2,817,418 | Vial | Dec. 24, 1957 |